(12) United States Patent
Carlesimo et al.

(10) Patent No.: US 10,320,911 B2
(45) Date of Patent: Jun. 11, 2019

(54) VEHICLE NETWORK IMPLEMENTING XCP PROTOCOL POLICY AND METHOD

(71) Applicant: GM GLOBAL TECHNOLOGY OPERATIONS LLC, Detroit, MI (US)

(72) Inventors: Daniel P. Carlesimo, Macomb Township, MI (US); Joseph E. Ploucha, Commerce Township, MI (US); Corey Wideman, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 121 days.

(21) Appl. No.: 15/646,092

(22) Filed: Jul. 11, 2017

(65) Prior Publication Data

US 2019/0020717 A1    Jan. 17, 2019

(51) Int. Cl.
| | |
|---|---|
| *H04L 29/08* | (2006.01) |
| *H04L 12/403* | (2006.01) |
| *G07C 5/08* | (2006.01) |
| *H04L 12/40* | (2006.01) |
| *B60W 50/00* | (2006.01) |

(52) U.S. Cl.
CPC .............. *H04L 67/12* (2013.01); *B60W 50/00* (2013.01); *G07C 5/08* (2013.01); *H04L 12/403* (2013.01); *H04L 12/40169* (2013.01); *H04L 2012/40215* (2013.01)

(58) Field of Classification Search
None
See application file for complete search history.

(56) References Cited

U.S. PATENT DOCUMENTS

| | | | |
|---|---|---|---|
| 9,729,431 B1 * | 8/2017 | Orr | H04L 45/24 |
| 2011/0090102 A1 * | 4/2011 | Brodt | G06F 13/4072 |
| | | | 341/106 |
| 2015/0312150 A1 * | 10/2015 | Brune | H04L 69/22 |
| | | | 370/392 |

* cited by examiner

*Primary Examiner* — Christine T Duong
(74) *Attorney, Agent, or Firm* — Lorenz & Kopf LLP

(57) ABSTRACT

A communication network implements a Universal Measurement and Calibration Protocol (XCP) policy. The communication network includes a plurality of nodes, each of the nodes being operably connected to a bus to send and to receive data communications to and from others of the plurality of nodes. Certain of the data communications include a Universal Measurement and Calibration Protocol (XCP) identifier indicating the presence of XCP protocol within the data frame. At least one of the nodes is configured to mitigate identified XCP protocol in accordance with the policy.

11 Claims, 2 Drawing Sheets

VEHICLE NETWORK IMPLEMENTING XCP PROTOCOL POLICY AND METHOD

TECHNICAL FIELD

This patent generally relates to a communication network for a vehicle, and more particularly, this patent relates to a vehicle communication network and method implementing Universal Measurement and Calibration Protocol (XCP) protocol policy within the communication network.

BACKGROUND

Vehicles are typically equipped with one or more controllers or control devices that are linked by at least one network or bus structure. It is common for a vehicle to have numerous electronic control units (ECUs) for various subsystems. The various ECUs may be provided by different suppliers, utilize different processors and have different memory structures. A supplier of ECUs may supply a common ECU architecture to numerous original equipment manufactures (OEM), which may utilize standard protocols and data structures, proprietary protocols and data structures or combinations thereof.

The Universal Measurement and Calibration Protocol (XCP) standard defines a bus-independent communication protocol to connect ECUs with calibration systems regardless of the network protocol or the ECU configuration. The primary purpose of XCP is to adjust internal parameters and acquire the current values of internal variables of an ECU for calibration, diagnostic and other similar purposes. The first letter X in XCP expresses the fact that the protocol is designed for a variety of bus systems. The standard consists of a base standard, which describes memory-oriented protocol services without direct dependencies on specific bus systems. Several associated standards contain the transport layer definitions allowing adaptation of XCP to controller area network (CAN), FlexRay, Ethernet (UDP/IP and TCP/IP), USB among other network standards.

XCP may be used to access the structure and memory of an ECU. Because of this capability, the protocol can be used to acquire access to one or more ECUs within a vehicle. This access may include the ECU's memory management unit and the ECU's memory write or read capability. To limit this access, on a distributed basis each ECU may implement a mechanism to restrict XCP access and usage.

An ECU may be modified, non-standard or ancillary or an ECU or processor coupled to the communication bus after manufacture and delivery of the vehicle. Such a modified, non-standard or added ECU may not incorporate controls and limitations to XCP ECU access. Accordingly, it is desirable to provide a communication network and a method of communicating data via a network that provide on a network basis XCP identification, and as appropriate, limitations on XCP usage. It is further desirable to provide vehicles incorporating such protocols and methods. Furthermore, other desirable features and characteristics of the present disclosure will become apparent from the subsequent detailed description and the appended claims, taken in conjunction with the accompanying drawings and the foregoing technical field and background.

SUMMARY

In a non-limiting exemplary embodiment, a communication network implements a Universal Measurement and Calibration Protocol (XCP) policy. The communication network includes a plurality of nodes, each of the nodes being operably connected to a bus to send and to receive data communications to and from others of the plurality of nodes. Certain of the data communications include a Universal Measurement and Calibration Protocol (XCP) identifier indicating the presence of XCP protocol within the data frame. At least one of the nodes is configured to mitigate identified XCP protocol in accordance with the policy.

In another non-limiting exemplary embodiment, a communication network implements a Universal Measurement and Calibration Protocol (XCP) policy. The communication network includes a plurality of nodes, each of the nodes being operably connected to a bus to send and to receive data communications to and from others of the plurality of nodes. Certain of the data communications include a Universal Measurement and Calibration Protocol (XCP) identifier indicating the presence of XCP protocol within the data frame. At least one of the nodes is a Master Policy Electronic Control Unit (ECU) configured to mitigate identified XCP protocol in accordance with the policy.

In another non-limiting exemplary embodiment, a communication network implements a Universal Measurement and Calibration Protocol (XCP) policy. The communication network includes a plurality of nodes, each of the nodes being operably connected to a bus to send and to receive data communications to and from others of the plurality of nodes. Certain of the data communications include a Universal Measurement and Calibration Protocol (XCP) identifier indicating the presence of XCP protocol within the data frame. At least one of the nodes is a Master Policy Electronic Control Unit (ECU), and the Master Policy ECU includes the XCP policy, the Master Policy ECU configured to mitigate identified XCP protocol in accordance with the policy.

In another non-limiting exemplary embodiment, a communication network implements a Universal Measurement and Calibration Protocol (XCP) policy. The communication network includes a plurality of nodes, each of the nodes being operably connected to a bus to send and to receive data communications to and from others of the plurality of nodes. Certain of the data communications include a Universal Measurement and Calibration Protocol (XCP) identifier indicating the presence of XCP protocol within the data frame. At least one of the nodes is a Master Policy Electronic Control Unit (ECU), and the Master Policy ECU includes the XCP policy, the Master Policy ECU configured to mitigate identified XCP protocol in accordance with the policy within a layer portion of a multi-layer communication protocol.

In another non-limiting exemplary embodiment, a communication network implements a Universal Measurement and Calibration Protocol (XCP) policy. The communication network includes a plurality of nodes, each of the nodes being operably connected to a bus to send and to receive data communications to and from others of the plurality of nodes. Certain of the data communications include a Universal Measurement and Calibration Protocol (XCP) identifier indicating the presence of XCP protocol within the data frame. At least one of the nodes is configured to mitigate identified XCP protocol in accordance with the policy by overwriting the XCP protocol.

In another non-limiting exemplary embodiment, a communication network implements a Universal Measurement and Calibration Protocol (XCP) policy. The communication network includes a plurality of nodes, each of the nodes being operably connected to a bus to send and to receive data communications to and from others of the plurality of nodes.

Certain of the data communications include a Universal Measurement and Calibration Protocol (XCP) identifier indicating the presence of XCP protocol within the data frame. At least one of the nodes is configured to mitigate identified XCP protocol in accordance with the policy by discarding the XCP protocol.

In another non-limiting exemplary embodiment, a communication network implements a Universal Measurement and Calibration Protocol (XCP) policy. The communication network includes a plurality of nodes, each of the nodes being operably connected to a bus to send and to receive data communications to and from others of the plurality of nodes. Certain of the data communications include a Universal Measurement and Calibration Protocol (XCP) identifier indicating the presence of XCP protocol within the data frame. At least one of the nodes is configured to mitigate identified XCP protocol in accordance with the policy by misaddressing the XCP protocol.

In another non-limiting exemplary embodiment, a communication network implements a Universal Measurement and Calibration Protocol (XCP) policy. The communication network includes a plurality of nodes, each of the nodes being operably connected to a bus to send and to receive data communications to and from others of the plurality of nodes. Certain of the data communications include a Universal Measurement and Calibration Protocol (XCP) identifier indicating the presence of XCP protocol within the data frame. At least one of the nodes is configured to mitigate identified XCP protocol in accordance with the policy. Each of the plurality nodes optionally comprises a localized XCP policy portion.

In another non-limiting exemplary embodiment, a communication network implements a Universal Measurement and Calibration Protocol (XCP) policy. The communication network includes a plurality of nodes, each of the nodes being operably connected to a bus to send and to receive data communications to and from others of the plurality of nodes. Certain of the data communications include a Universal Measurement and Calibration Protocol (XCP) identifier indicating the presence of XCP protocol within the data frame. At least one of the nodes is configured to mitigate identified XCP protocol in accordance with the policy. The data communication has a controller area network (CAN) data frame structure, and the identifier is an XCP identifier.

In another non-limiting exemplary embodiment, a vehicle includes a communication network that implements a Universal Measurement and Calibration Protocol (XCP) policy. The communication network includes a plurality of nodes, each of the nodes being operably connected to a bus to send and to receive data communications to and from others of the plurality of nodes. Certain of the data communications include a Universal Measurement and Calibration Protocol (XCP) identifier indicating the presence of XCP protocol within the data frame. At least one of the nodes is configured to mitigate identified XCP protocol in accordance with the policy.

In another non-limiting exemplary embodiment, a vehicle includes a communication network implements a Universal Measurement and Calibration Protocol (XCP) policy. The communication network includes a plurality of nodes, each of the nodes being operably connected to a bus to send and to receive data communications to and from others of the plurality of nodes. Certain of the data communications include a Universal Measurement and Calibration Protocol (XCP) identifier indicating the presence of XCP protocol within the data frame. At least one of the nodes is configured to mitigate identified XCP protocol in accordance with the policy. At least one of the nodes is a Master Policy Electronic Control Unit (ECU).

In another embodiment, a method of implementing a Universal Measurement and Calibration Protocol (XCP) policy within a communication network including a plurality of nodes at least one of which is designated as a Master Policy electronic control unit (ECU) is provided. The method includes receiving a communication, the communication containing an XCP identifier, identifying the communication and mitigating an XCP protocol of the communication in accordance with the policy.

In another embodiment, a method of implementing a Universal Measurement and Calibration Protocol (XCP) policy within a communication network including a plurality of nodes at least one of which is designated as a Master Policy electronic control unit (ECU) is provided. The method includes receiving a communication, the communication containing an XCP identifier, identifying the communication and mitigating an XCP protocol of the communication in accordance with the policy via a Master Policy ECU.

In another embodiment, a method of implementing a Universal Measurement and Calibration Protocol (XCP) policy within a communication network including a plurality of nodes at least one of which is designated as a Master Policy electronic control unit (ECU) is provided. The method includes receiving a communication, the communication containing an XCP identifier, identifying the communication and mitigating an XCP protocol of the communication in accordance with the policy via a Master Policy ECU by overwriting the XCP protocol.

In another embodiment, a method of implementing a Universal Measurement and Calibration Protocol (XCP) policy within a communication network including a plurality of nodes at least one of which is designated as a Master Policy electronic control unit (ECU) is provided. The method includes receiving a communication, the communication containing an XCP identifier, identifying the communication and mitigating an XCP protocol of the communication in accordance with the policy via a Master Policy ECU by misaddressing the XCP protocol.

In another embodiment, a method of implementing a Universal Measurement and Calibration Protocol (XCP) policy within a communication network including a plurality of nodes at least one of which is designated as a Master Policy electronic control unit (ECU) is provided. The method includes receiving a communication, the communication containing an XCP identifier, identifying the communication and mitigating an XCP protocol of the communication in accordance with the policy via a Master Policy ECU by discarding the XCP protocol.

In another embodiment, a method of implementing a Universal Measurement and Calibration Protocol (XCP) policy within a communication network including a plurality of nodes at least one of which is designated as a Master Policy electronic control unit (ECU) is provided. The method includes receiving a communication, the communication containing an XCP identifier, identifying the communication and mitigating an XCP protocol of the communication in accordance with the policy via a Master Policy ECU by invoking the XCP policy.

In another embodiment, a method of implementing a Universal Measurement and Calibration Protocol (XCP) policy within a communication network including a plurality of nodes at least one of which is designated as a Master Policy electronic control unit (ECU) is provided. The method includes receiving a communication, the communication containing an XCP identifier, identifying the communication and mitigating an XCP protocol of the communication in accordance with the policy via a Master Policy ECU. The communication has a CAN data format, and identifying the communication includes determining the presence of the XCP identifier.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
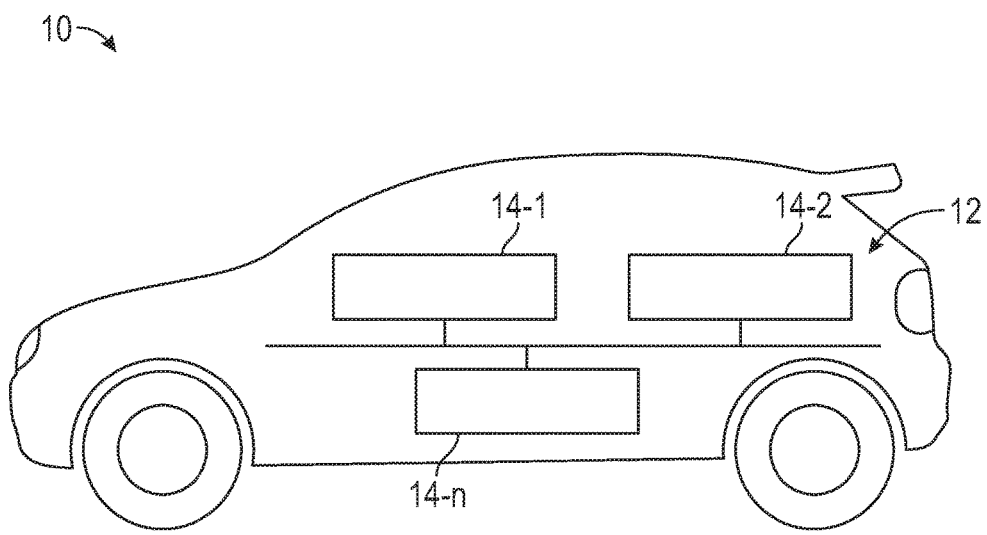
FIG. 1 is a graphic illustration of a vehicle including a communication network structure implementing Universal Measurement and Calibration Protocol (XCP) policy within the communication network structure in accordance with the herein described embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group) that executes one or more software or firmware programs, memory to contain software or firmware instructions, a combinational logic circuit, and/or other suitable components that provide the described functionality.

Exemplary embodiments may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment of the invention may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the exemplary embodiments may be practiced in conjunction with any number of mechanical and/or electronic systems, and that the vehicle systems described herein are merely exemplary embodiment of possible implementations.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Referring to FIG. 1 a vehicle 10 includes a network structure 12 to which operably, communicatively coupled are a plurality of nodes, e.g., electronic control units (ECUs) (collectively referred to as ECU 14 and individually identified as ECU 14-1, 14-2 and 14-$n$). While three (3) ECUs are depicted, it will be appreciated that the vehicle 10 is likely to have many more than three ECUs. Without limiting the generality of the herein described exemplary embodiments, the ECUs may be one of the myriad ECUs typically deployed within a vehicle including powertrain/engine, active restraint, braking, chassis, body, infotainment, autonomous operation and the like. Accordingly, each ECU may include one or more processors and memory including firmware and/or software executable by the processors to effect the ECU functionality. Furthermore, a node need not be an ECU, but it may be any electronic device or control capable of transmitting and/or receiving data via the network 12. In this exemplary description, the network structure 12 may be configured as a controller area network (CAN) to operate in accordance with the CAN network protocol, e.g., ISO 11898.

Configured in accordance with the CAN protocol, the network 12 incorporates a communication structure to provide an interchange of digital information between ECUs 14. Each ECU 14 implements a CAN layered architecture 16 (FIG. 2) to provide for data communication. Each data communication contains information to be communicated, and makes use of predetermined framing formats, rules and standards of a common communication protocol, e.g., CAN, required to make communication effective from a first ECU 14 to a second ECU 14 of the plurality of ECUs. Generally speaking the CAN frame structure is the required organization of bits to construct a complete data frame for transmission. The CAN data frame structure is composed of a Start of Frame (SOF), Arbitration field (where the identifier is located), Control Field, Data, Cyclic Redundancy Check (CRC), Acknowledgement (Ack), End of Frame (EOF) and termination (ITM). Suitable frame structures include CAN 2.0A and CAN 2.0B or may include CAN Flexible Data Rate Frame format, with a generalize CAN data frame 18 depicted in FIG. 3.

Figure 2:
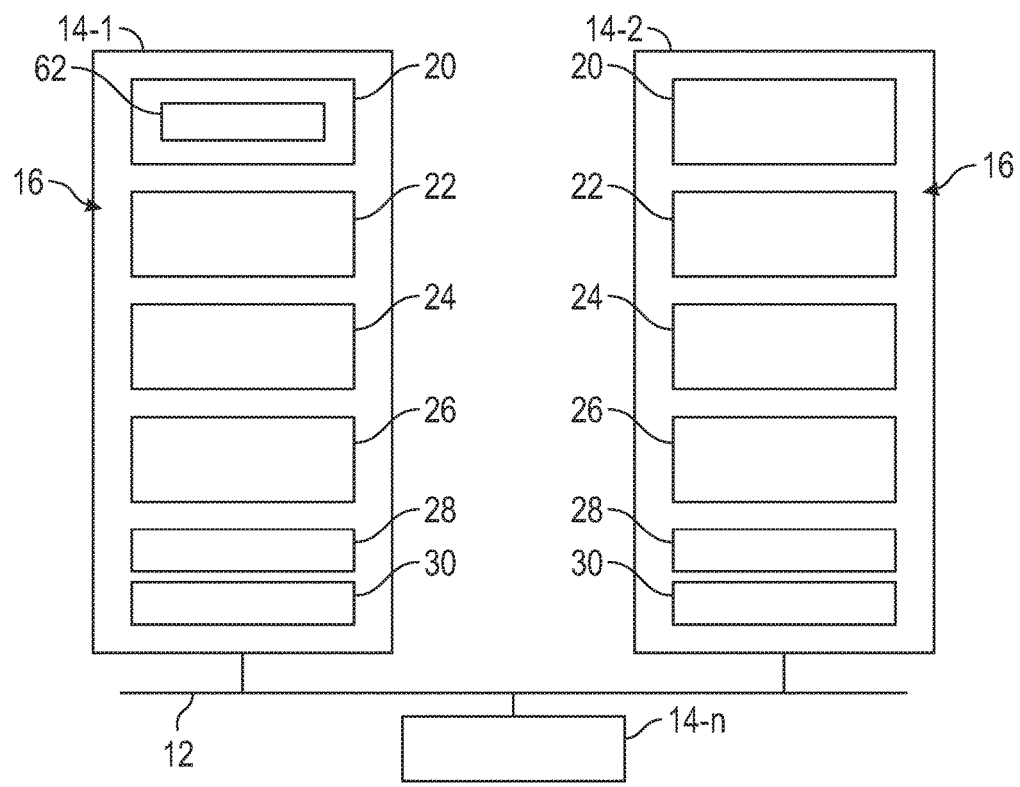
FIG. 2 is a block diagram of a communication network structure in accordance with herein described exemplary embodiments.

Referring to FIG. 2, and as alluded to above, the ECUs 14 implement a layered architecture 16 that includes at a highest level an application layer 20 with subsequent additional presentation 22, session 24, transport 26, network 28, data link 30 and physical 32 layers. Additional layers may be provided as permitted or as required by the appropriate communication standard, such as, for example, the CAN standard. The data link 30 and the physical 32 layers provide the communication interconnection of the ECUs 14 within the network 12. More particularly, the data link layer (DLL) 30 provides services for transferring frames to the physical layer 32. It manages the protocol of the network structure 12 (bit timing, arbitration, error detection, etc.). The DLL 30 receives a string of bits from the physical layer 32, performs error checking, removes protocol information, and passes the data and identifier to the network layer 28. Conversely, the DLL 30 accepts data and associated information on a frame basis from the network layer 28, adds communication, e.g., CAN, protocol information and passes it to the physical layer 32 on a bit-by-bit basis.

Figure 3:
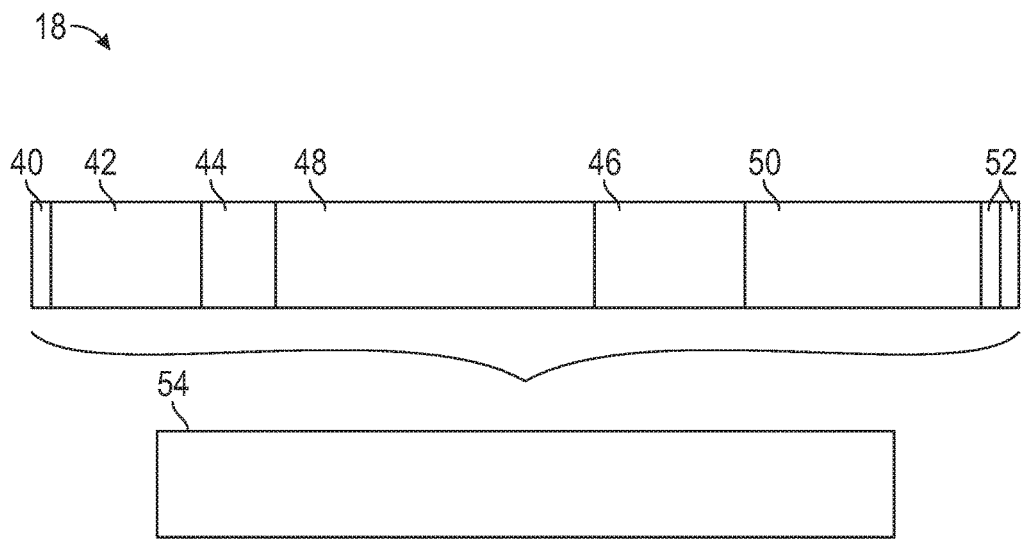
FIG. 3 is a graphic depiction of an example data frame.

FIG. 3 depicts in a generalize manner for purposes of illustrating the herein described embodiments, a data frame 18, which may otherwise be in accordance with the CAN standard and includes a start bit 40, an arbitration field 42, a control field 44, a check field 46, a data field 48, an end of frame 50 and one or more termination bits 52. The XCP compliant protocol is adaptable to various communication protocols, and in accordance therewith may be adapted to the data frame 18. As shown in FIG. 3, an XCP identifier 54 is contained within the data frame 18 that identifies the data frame 18 as containing XCP protocol. As depicted in FIG. 3, the XCP identifier 54 may be contained in any portion of the data frame 18 as would be permitted and/or defined by the applicable communication standard. In certain instances, the XCP identifier 54 may be a communication protocol required identifier for XCP protocol within a specific location of the data frame 18, such as the 29 bit XCP protocol identifier specified by the CAN standard. In accordance with other communication network standards, such as FlexRay, UDP/IP, TCP/IP and the like, the XCP identifier 54 will be made part of a data frame in accordance with the applicable communication standard. In this regard, and given the standard structure of the XCP identifier 54, an XCP protocol contained with the data frame 18 is easily identified.

As discussed above, and for purposes of the herein described embodiments, the XCP identifier 54 refers to content of the data frame 18, in any form, identifying the data frame as containing XCP protocol or intended to invoke an XCP protocol within the network 12. In accordance with the herein described embodiments, neither the structure of nor the actual XCP data is important. The early identification of the data frame 18 as containing XCP protocol may be acted upon without discerning the actual data frame 18 content. For example, and as noted above, considering the extended frame format (29-bit identifier) nature of XCP on CAN, it is possible to take actions based on the Extended Format Identifier field contained inside the Arbitration Field (42). Because the Arbitration Field (42) comes prior to the data field (48), it is possible to identify a data frame 18 without considering the actual XCP protocol contained within the data field 18.

With reference again to FIGS. 1 and 2, in accordance with the herein described exemplary embodiments an ECU of the plurality of ECUs 14 is designated as a Master Policy ECU, and for example, the ECU 14-1 may be designated the Master Policy ECU. However, it should be appreciated that while in an exemplary embodiment a single specific ECU 14 is configured as the Master Policy ECU, the functionality of the Master Policy ECU may be implemented in one or more other of the ECUs 14 deployed within the vehicle 10 that act in concert to provide a virtual Master Policy ECU, for example.

The Master Policy ECU 14-1 implements a centralized master XCP policy 62 responsible for secure unlocking and limited acceptance of XCP protocol on a network basis in contrast to consideration of XCP protocol being conducted on an ECU-by-ECU basis. Within the remaining ECUs 14, e.g., ECUs 14-2 through 14-n, each may implement a localized protection mechanism 64 against XCP protocol exploitation. In accordance with the exemplary embodiments, therefore, ultimate protection is provided through implementation of a Master Policy ECU 14-1 that is responsible for detecting and mitigating intended or unintended XCP protocol on a network basis reducing reliance upon XCP mitigation being implemented in each individual ECU.

The master XCP policy 62 may be implemented within any suitable layer or layers of the layered architecture. The XCP policy 62 may be implemented in high level layers, and for example FIG. 2 depicts the policy as part of the application layer 20 of the CAN layered architecture 16 operative within each of the ECUs 14, facilitating coordination of XCP policy 62 implementation through all layers of the communication protocol. In additional exemplary embodiments, aspects of the policy, such as XCP identification may be disposed within lower layers of the architecture, while other aspects of the policy, e.g., XCP mitigation, may be implemented in other layers, such as higher layers of the layered architecture. The XCP policy 62 provides for the secure unlocking XCP protocol via the Master Policy ECU 14-1 before XCP protocol is acted upon within the network. If the XCP policy 62 is not fulfilled and a data frame 18 containing XCP protocol is detected, then the Master Policy ECU 14-1 interjects and mitigates, e.g., destroys, the XCP attempted without interfering with other network messaging. If the XCP policy 62 is fulfilled, the Master Policy ECU 14-1 accepts the data frames with XCP protocol on a limited basis, e.g., until an ECU is reset or put into a sleep mode, effectively blocking inadvertent or disruptive use of XCP capabilities.

As provided in accordance with the herein described embodiments, secure unlocking of XCP protocol is a secure access control mechanism that is implemented on a network basis via the Master Policy ECU 14-1. In one embodiment, the network 12 implements UDS (Unified Diagnostic Services) as the diagnostic communication protocol (which is specified in the ISO 14229-1). The Master Policy ECU 14-1 receives via SID (Service Identifier) 0x27 (a.k.a "Security Access") a "challenge request" for a specific security access sub-function (e.g. 0x0D, which may be reserved for Suppliers). The Master ECU then responds with a "challenge" (sometimes also known as "seed") via SID 0x27. The secure unlock is only accomplished after the Master Policy ECU 14-1 receives the correct "response" (sometimes also known as "key") for the sub-function. The policy 62 may further leverage general vehicle status, e.g., vehicle speed information, in order to further restrict XCP data content unlocking and acceptance.

Figure 4:
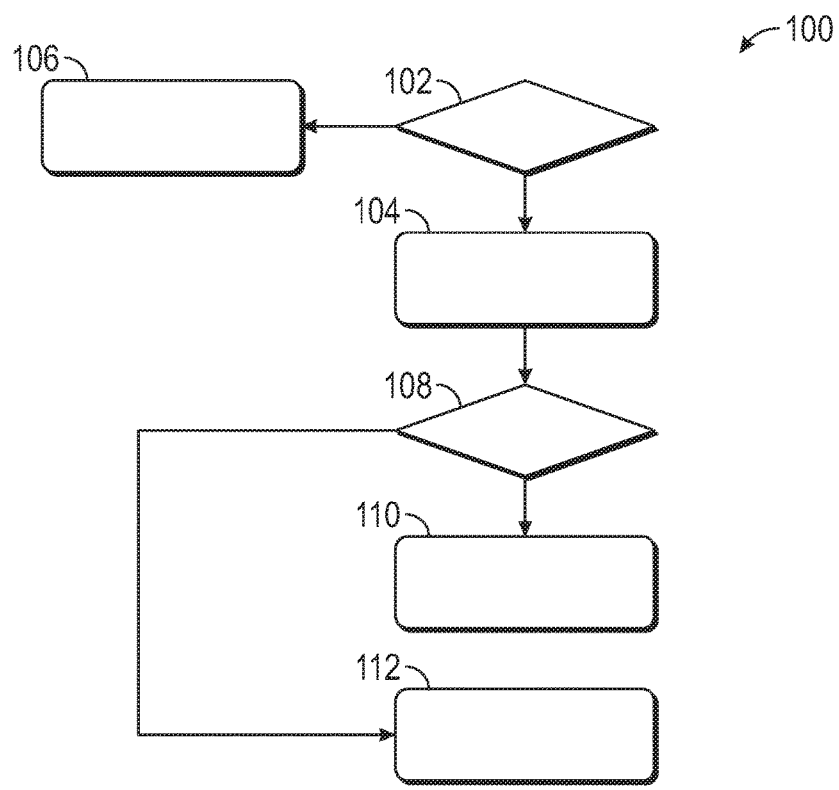
FIG. 4 is a flowchart illustration of a method of implementing an XCP protocol policy in accordance with the herein described exemplary embodiments.

FIG. 4 depicts in flow chart form a method 100 providing secure unlocking and limited acceptance of XCP protocol of a data communication within the communication network 12 in accordance with the herein described embodiments of a XCP policy 62. At 102, if a data frame 18 contains an XCP identifier, for example, XCP identifier 54, the Master Policy ECU 14-1 initiates the XCP policy process 104. If the data frame 18 does not contain an XCP identifier, the XCP policy is not initiated 106.

At 108, the XCP protocol within the data frame 18 is considered in terms of the XCP policy. If the XCP protocol of the CAN data frame 18 passes secure unlocking, the XCP protocol of the CAN data frame 18 is permitted 110. In one exemplary embodiment, the XCP policy establishes that XCP protocol can only be accepted while a proprietary, e.g., Supplier security access (0x0D) has been unlocked, i.e., successfully passed the sub-function's challenge-response mechanism. If appropriately unlocked, then the XCP protocol of the CAN data frame 18 may be permitted, 110, if other vetting variables monitored by the policy, e.g., vehicle speed=0, further allows it. The XCP policy 110 must be immediately cease in case any cancelling criteria is observed, e.g., changes on the vetting variables, or in case the module is reset or put into a sleep mode. Else at 108 the XCP protocol has not passed secured unlocking and is not permitted, and the XCP policy mitigates the XCP protocol, 112.

In accordance with the exemplary embodiments, mitigation of the XCP protocol within a data frame 18 may include detecting and destroying the XCP protocol within the data frame 18. In one embodiment, the design of network 12 establishes that no ECU 14 shall respond to the Destination Address 0x00 (hexadecimal representation of 8 consecutive "0" bits, knowing zero is the dominant bit on a CAN bus). In this embodiment, the policy may consider overwriting the entire destination address field with dominant bits in order to make sure no ECUs 14 will accept and process this XCP frame command. Mitigation may include any suitable manipulation of the XCP protocol which prevents successful execution of XCP up to and including discarding the CAN data frame 18. The effect is to prevent intentional or unintentional invocation of XCP protocol on an ECU 14 when the XCP protocol is not in accordance with an XCP policy implemented via the Master Policy ECU 14-1. This is true even if an ECU has an unreported XCP capability, because unless unlocked by the Master Policy ECU 14-1, the XCP protocol is mitigated through the Master Policy ECU 14-1 applying the master XCP policy 62.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A communication network implementing a Universal Measurement and Calibration Protocol (XCP) policy comprising:
   a plurality of nodes, each of the nodes being operably connected to a bus to send and to receive data communications to and from other of the plurality of nodes, wherein a first node of the plurality of nodes is a Master Policy electronic control unit (ECU) node,
   wherein certain of the data communications include a Universal Measurement and Calibration Protocol (XCP) identifier indicating the presence of XCP protocol within a data frame, and
   the Master Policy ECU node is configured to mitigate identified XCP protocol within a data frame in accordance with the policy prior to the data frame being acted upon by a remaining node of the plurality nodes, wherein
   the Master Policy ECU node is configured to identify a data frame as containing XCP protocol without discerning actual data content of the data frame and to securely unlock the XCP protocol contained within a data frame following a successful challenge of the XCP protocol within the data frame, and wherein the Master Policy ECU node is further configured to mitigate XCP protocol contained within a locked data frame.

2. The communication network of claim 1, wherein the XCP policy is implemented within a layer portion of a multi-layer communication protocol.

3. The communication network of claim 1, wherein the Master Policy ECU node is configured to mitigate the XCP protocol by overwriting XCP protocol.

4. The communication network of claim 1, wherein the Master Policy ECU node is configured to mitigate the XCP protocol by discarding the XCP protocol.

5. The communication network of claim 1, wherein the Master Policy ECU node is configured to mitigate the XCP protocol by misaddressing the XCP protocol.

6. The communication network of claim 1, the data communications comprises controller area network (CAN) data frame structures, and wherein the XCP protocol is contained within the CAN data frame structures.

7. A vehicle comprising:
   a communication network, the communication network having a plurality of nodes, each of the nodes being operably connected to a bus to send and to receive data communications to and from other of the plurality of nodes, wherein a first node of the plurality of nodes is a Master Policy electronic control unit (ECU) node,
   wherein certain of the data communications include a Universal Measurement and Calibration Protocol (XCP) identifier indicating the presence of XCP protocol within a data frame, and
   the Master Policy ECU node is configured to mitigate identified XCP protocol within a data frame in accordance with the policy prior to the data frame being acted upon by a remaining node of the plurality nodes, wherein
   the Master Policy ECU node is configured to identify a data frame as containing XCP protocol without discerning actual data content of the data frame and to securely unlock the XCP protocol contained within a data frame following a successful challenge of the XCP protocol within the data frame, and wherein the Master Policy ECU node is further configured to mitigate XCP protocol contained within a locked data frame.

8. A method of implementing a Universal Measurement and Calibration Protocol (XCP) policy within a communication network that includes a plurality of nodes at least one of which is designated as a Master Policy electronic control unit (ECU), the method comprises
   receiving at the Master Policy ECU a communication data frame, the communication data frame containing an XCP identifier,
   identifying within the Master Policy ECU the communication data frame as having XCP protocol without discerning actual data content of the data frame based upon the XCP identifier before the communication data frame is otherwise acted upon by a remaining node of the plurality of nodes;
   securely unlocking by the Master Policy ECU the XCP protocol contained within a communication data frame following a successful challenge of the XCP protocol within the communication data frame and
   mitigating by the Master Policy ECU an unlocked XCP protocol within the communication data frame of the communication in accordance with the policy.

9. The method of claim 8, wherein mitigating the XCP protocol comprises overwriting the XCP protocol.

10. The method of claim 8, wherein mitigating the XCP protocol comprises misaddressing the XCP protocol.

11. The method of claim 8, wherein mitigating the XCP protocol comprises discarding the XCP protocol.

\* \* \* \* \*